United States Patent Office 3,591,640
Patented July 6, 1971

---

3,591,640
PROCESS FOR THE PRODUCTION OF ETHYLENIC COMPOUNDS
Duncan Clark and Percy Hayden, Norton-on-Tees, England, assignors to Imperial Chemical Industries Limited, London, England
No Drawing. Continuation-in-part of application Ser. No. 483,860, Aug. 30, 1965. This application July 29, 1968, Ser. No. 748,218
Int. Cl. C07c *41/06, 41/10, 43/00*
U.S. Cl. 260—614                     15 Claims

ABSTRACT OF THE DISCLOSURE

Unsaturated ethers are produced with reduced by-product acetal formation by reacting a vinyl or allyl alkanoate with an alkanol at −50 to 200° C. in a solution containing not more than 10% water, a palladium salt or complex palladium compound and a stationary concentration of the acetal formed as by-products in the process.

---

This application is a continuation-in-part of co-pending U.S. application Ser. No. 483,860 filed Aug. 30, 1965, now abandoned.

The invention relates to the production of ethylenic compounds, particularly ethylenic ethers, from vinyl or allyl esters of aliphatic carboxylic acids.

The process comprises contacting a vinyl or allyl ester of an aliphatic carboxylic acid with an aliphatic alcohol containing 1 to 20 carbon atoms or a monohydric, dihydric or polyhydric phenol under substantially anhydrous conditions, in the presence of a salt or co-ordination compound of a noble metal of Group VIII of the Mendeléeff Periodic Table.

The vinyl or allyl esters which may be used in the process may be represented by the formulae:

$$\underset{R_2}{\overset{R_1}{\diagdown}}C=C\underset{OCOR_6}{\overset{R_3}{\diagup}} \quad \text{vinyl ester}$$

$$\underset{R_2}{\overset{R_1}{\diagdown}}C=\underset{R_5}{\overset{R_3}{\underset{|}{C}}}-\underset{}{\overset{R_4}{\underset{|}{C}}}-OCOR_6 \quad \text{allyl ester}$$

in which $R_1$, $R_2$, $R_3$, $R_4$ and $R_5$ may be hydrogen, an organic substituent or a halogen atom, and $R_6$ is an alkyl group with a straight or branched carbon atom chain, or hydrogen.

The organic substituents represented by $R_1$, $R_2$, $R_3$, $R_4$ and $R_5$ may be alkyl, cycloalkyl, aryl or heterocyclic groups, or any two of the groups $R_1$, $R_2$, $R_3$, $R_4$ and $R_5$ on adjacent carbon atoms may be combined in such a way that the two adjacent carbon atoms are included in a cycloalkyl, aryl or hetero-cyclic ring. In this case structures of the type:

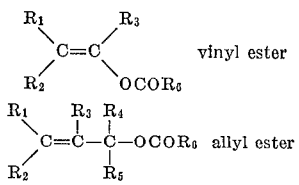

(a)        (b)        (c)

are obtained. The vinyl esters (a) and (b) however may be unstable and isomerise to give the corresponding allyl structures (d) and (e).

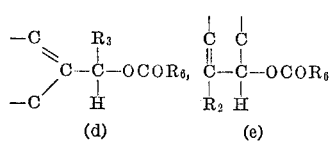

(d)        (e)

which may however be used in the process of the invention. Preferred esters for use in the process are vinyl or allyl esters of alkanoic acids containing up to 20 carbon atoms preferably 2 to 6 carbon atoms. Examples of suitable esters are vinyl and allyl propionate, vinyl butyrate, allyl hexanoate and vinyl and allyl esters of carboxylic acids obtained by reaction of $C_6$ to $C_{14}$ olefines with carbon monoxide and water in the presence of an acid catalyst. Preferred esters are acetates such as vinyl, isopropenyl and allyl acetates.

The aliphatic alcohol used in the process may be a monohydric, dihydric or polyhydric saturated or unsaturated alcohol containing 1 to 20 carbon atoms. Preferably the alcohol contains 1 to 6 carbon atoms, for example alkanols such as methanol, ethanol, n-propanol, isopropanol, n-butanol and isobutanol. The overall reaction is:

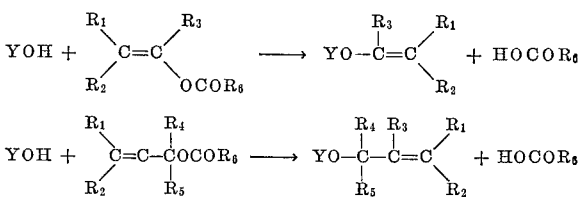

where Y=an aliphatic or aromatic residue corresponding to the alcohol or phenol used.

The process is particularly useful for the production of ethylenic ethers from a vinyl or allyl ester and an alcohol or phenol. Thus vinyl acetate and methanol or isobutanol give vinyl methyl ether or vinyl isobutyl ether respectively, compounds which are useful as polymerisable monomers and intermediates in the production of pyridine and pyridine derivatives. Similarly allyl acetate and methonal or isobutanol give allyl methyl ether or allyl isobutyl ether respectively.

The noble metals of Group VIII of the Periodic Table which, in the form of their salts or co-ordination compounds are used in the process of the invention are ruthenium, rhodium, palladium, osmium, iridium and platinum. Palladium, platinum and rhodium are preferred metals for use in the process, especially palladium.

The metal is used in the process in the form of a salt or co-ordination compound, preferably one in which the metal exhibits its normal valency ("normal valency" is the valency that an element exhibits in a majority of its compounds—Van Nostrand's Chemists Dictionary 1953, p. 723). Any salt may be used in the process for example halides or carboxylates especially lower aliphatic carboxylates containing up to six carbon atoms. In particular chlorides, bromides and acetates, for example palladous chloride, palladous bromide or palladous acetate may be used. Other examples of carboxylates which may be used include the propionates, butyrates, isobutyrates and crotonates of the noble metals of Group VIII. Mono- and di-carboxylates unsubstituted or substituted with non-reactive substituents e.g. palladous chloro-acetate are contemplated for use herein. For the reaction to be homogeneous however it is necessary that the metal salt should be soluble in the reaction medium. Many of the salts of the Group VIII noble metals are however relatively insoluble under the conditions of the process but it has been found that some co-ordination compounds show a higher degree of solubility and may thus be advantageously used in the homogeneous reaction. In these co-ordination compounds the noble metal of Group VIII forms part of a complex with another ion or molecule. Suitable components of the complex include anions such as chloride, acetate, nitrate and sulphate ions and cations especially alkali or alkaline earth metal cations particularly sodium and lithium. Molecules which may form part of the complex include benzonitrile, organo phos-

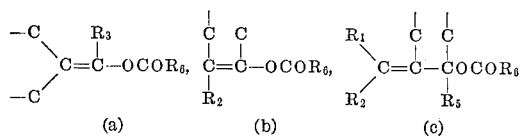

phines, phosphine oxides, phosphates and phosphites particularly triphenyl phosphine, triphenyl phosphine oxide, triphenyl phosphate and triphenyl phosphite, and an allyl group. Complex compounds which may advantageously be used in the process include the alkali metal halopalladites and haloplatinites e.g. lithium chloropalladite, lithium chloroplatinite, sodium chloropalladite, potassium chloropalladite, sodium and potassium bromopalladite, chloroplatinic acid, dichlorobis(benzonitrile)palladium (II) ((PhCN)$_2$ PdCl$_2$) and sodium and lithium bromoplatinite. Lithium bromopalladite has been found to be especially effective, particularly when used in combination with certain solvents which complex with palladium, such as dimethyl sulphoxide. These solvents are discussed below. The co-ordination compound may be added to the reactants as such or may be formed in situ, for example lithium chloropalladite may be added as such or lithium chloride and palladous chloride may be added separately to form lithium chloropalladite in the reaction vessel.

The process may be carried out using stoichiometric proportions of ester and aliphatic alcohol or phenol or one of the reactants may be used in excess as the solvent. Preferably however the vinyl or allylic ester is used in excess as this reduces unwanted by-product formation. The process may also employ an inert solvent which may be an aliphatic hydrocarbon, for example, pentane, hexane, octane or cyclohexane, an aromatic hydrocarbon, for example benzene, toluene or xylene, an ether, for example diethyl ether, an ester for example dinonyl phthalate, or well known solvents such as tetrahydrofuran, dioxane, dimethylacetamide, sulpholane, dimethyl sulphoxide and benzonitrile.

The process of the invention is carried out under substantially anhydrous conditions as water may hydrolyse both the ethylenic reactant and product of the reaction. It is important therefore to keep the concentration of water in the process as low as possible, but a small amount of water, up to 10% by weight, may be tolerated. Preferably the water concentration is less than 5% by weight, more preferably less than 1% by weight.

The process may be carried out in the temperature range −50° C. to 200° C. Although at the lower end of the temperature range the rate of the reaction decreases, the yield of unwanted by-products such as acyloxy acetals and acetals is markedly decreased. It is preferable therefore to carry out the reaction at a low temperature, for example in the range −30° C. to 100° C., particularly in the range −20° C. to 80° C.

The process may be carried out at atmospheric pressure or at an elevated pressure. As it is often desirable to remove the products of the reaction as soon as they are formed to avoid secondary reactions taking place, the process may advantageously be carried out at a reduced pressure. A pressure of up to 10 atmospheres may be used, preferably 0.1 to 1 atmosphere.

As stated above the relative concentrations of the vinyl or allyl ester and the aliphatic alcohol or phenol may be stoichiometric, or one or the other may be in excess. The concentration of the Group VIII noble metal salt or co-ordination compound may be up to 1 molar, but is preferably not greater than 0.1 molar particularly 0.001 to 0.05 molar. Concentrations of less than 0.001 molar may be used, as the metal acts as a catalyst, but at very low concentrations the rate of the reaction decreases.

When the noble metal of Group VIII is palladium however it has been found that an effective concentration is in the range 0.00001 to 0.01 molar particularly 0.0001 to 0.0005 molar.

The process may be homogeneous or heterogeneous and may take place in the liquid or gaseous phase. The heterogeneous reaction in the liquid phase may be accomplished by agitating the reactants with a solid salt or co-ordination compound of the Group VIII noble metal deposited on a suitable support such as alumina, silica or, preferably, active carbon, or by passing the reactants through a bed of the metal salt or co-ordination compound also deposited on a suitable support. The gas phase reaction may be performed by passing the gaseous vinyl or allyl ester and the aliphatic alcohol or phenol over the metal salt deposited on a similar support.

A further feature of our invention relates to the use of Group VIII-B acetate or complex acetates particularly palladous acetate and lithium palladous acetate. We have found, for example, that when palladous acetate or a complex palladous acetate or, particularly platinic chloride or a complex platinic chloride is used in the process, precipitation of metallic palladium or platinum may occur with consequent loss of the catalyst. We have found that this may be prevented by the addition of an acid stronger than acetic acid preferably in concentration of up to 0.1% by weight, for example hydrochloric acid.

An additional feature of our invention also relates to the prevention of the precipitation of the catalyst, particularly palladium in the metallic form, by reductive side reactions. This precipitation may be prevented by incorporating a redox system in the process which may be used in the presence of oxygen. Reduction of the metal salt to the metal is prevented by the oxidizing property of the redox system which is itself converted to its reduced form. The reduced form of the redox is redoxidised by the oxygen present. A preferred redox system is that provided by a copper salt, for example cupric halide or carboxylate especially cupric chloride, cupric bromide or the cupric salt of an alkanoic acid containing up to six carbon atoms such as cupric acetate or cupric propionate in which the cupric form is reduced to cuprous, which in turn is reoxidised to the cupric form by molecular oxygen. The concentration of the redox system is preferably $10^{-2}$ to $10^{-4}$ molar. We have also found that when palladium is used copper may exert a beneficial effect on catalyst activity apart from preventing precipitation. For this purpose copper halides are preferred, particularly copper chloride in a concentration of 1–50 moles per mole of salt or co-ordination compound of palladium.

The process may be carried out in a batchwise or continuous manner. It is generally advantageous to remove the ethylenic product of the reaction continuously as it is formed, and this may be accomplished by means such as distillation, preferably under reduced pressure, or countercurrent extraction with a solvent. It is also helpful to purge the reaction mixture continuously with a stream of nitrogen, argon or other inert gas, condensing the vapours from the inert gas stream, returning unreacted material and removing the ethylenic product of the reaction. For a fully continuous process the second product of the reaction, the carboxylic acid, may also be removed continuously by taking a purge from the reaction vessel, distilling it or extracting it continuously and thereby separating the carboxylic acid from the catalyst and returning the latter to the process.

As described earlier one of the principal by-products produced in the process is acetals, i.e. the reaction products of aldehydes with alcohols, and a feature of the present invention is to reduce the formation of acetals.

Accordingly, therefore, in a process for the production of alkyl vinyl ethers or alkyl allyl ethers by contacting an aliphatic alcohol containing 1 to 20 carbon atoms, particularly 1 to 6 carbon atoms, with a vinyl or allyl ester, particularly vinyl or allyl acetate, in the presence of a salt or co-ordination compound of palladium, particularly a chlorine-containing salt or co-ordination compound of palladium, e.g. palladous chloride, the formation of acetals is reduced by the presence of a base.

The choice of the concentration of the base is dependent on reaction conditions such as temperature, but may lie between 0.1 and twice the molar concentration of the salt or co-ordination compound of palladium, particularly 0.2 to 0.4 times the molar concentration of the salt or co-ordination compound of palladium.

By "base" in this specification is meant a compound capable of neutralising acids stronger than acetic acid and, as well as including well known bases such as the alkali metal hydroxides, the term is intended to include salts of a strong base and a weak acid, such as the alkaline and alkaline earth metal carboxylates, particularly alkaline and alkaline earth metal alkanoates containing up to six carbon atoms such as lithium acetate and sodium propionate particularly lithium acetate.

A further modification of the process which also results in a reduced formation of acetals is the maintenance of a stationary concentration of acetals in the reaction mixture. A suitable concentration of acetal may be chosen with reference to the reaction conditions and although very high concentrations of acetal may be used the concentration is usually chosen by reference to economic considerations, such as reactor size. Such a concentration may be up to 10% by weight of the reaction mixture, preferably about 5%. Acetals may be deliberately added at the start of the process to provide the desired acetal concentration, and in a continuous process acetals may be removed or recycled at such a rate as to maintain the stationary concentration. For example, in the reaction of vinyl acetate with methanol, an initial concentration of about 3% by weight of 1,1 dimethoxyethane may be provided, and this concentration maintained throughout the reaction.

The fully continuous process includes the continuous removal of the alkanoic acid by taking a purge from the reaction vessel, distilling it or extracting it continuously, and thereby separating the alkanoic acid from the catalyst and returning the latter to the process. We have now found that the removal of the alkanoic acid may be considerably facilitated by maintaining a stationary concentration of alkanoic acid in the reaction mixture corresponding to the vinyl or allyl ester of the alkanoic acid used in the process and that this concentration does not affect the yield of ether. The stationary concentration of carboxylic acid may be up to 50% by weight of the reaction medium, but is preferably 15 to 30% by weight.

As described above, palladous chloride and palladous acetate and certain co-ordination compounds of palladium such as lithium chloropalladite are preferred catalysts. This latter compound may be added to the process as such, or be formed in situ by the separate addition of lithium chloride and palladous chloride. We have also found that lithium chloride exerts a beneficial effect on the process when used in excess of the amount required to form the lithium chloropalladite, particularly in respect of maintaining the catalytic activity of the palladium slat. Furthermore we have found that alkali metal halides in general show this desirable property, although lithium chloride is preferred. The alkali metal halide is preferably present in a concentration of up to 100 moles per mole of the salt or co-ordination compound of palladium, more preferably about 5 moles per mole of the salt or co-ordination compound of palladium.

In one preferred form of the invention a solution comprising $10^{-4}$ to $10^{-3}$ molar lithium chloropalladite and $10^{-3}$ to $10^{-2}$ molar lithium chloride in vinyl acetate (20 to 60% by weight), methanol (20 to 40% by weight) acetic acid (20 to 60% by weight) acetal (1 to 5% by weight) and up to 5% by weight water is heated to between 20 and 40° C. The partial pressure of the organic components is maintained at 50–200 mm. Methyl vinyl ether is continuously removed. A continuous purge is taken of the liquid content of the reaction vessel from which acetic acid is removed in amounts sufficient to maintain its initial concentration. The catalyst which is thereby removed may be recycled and/or fresh catalyst may be introduced. Vinyl acetate and methanol are supplied continuously as they are consumed.

The process according to the invention will now be further described by means of the following examples.

EXAMPLE 1

50 gms. (0.58 mole) of vinyl acetate, 40 gms. (0.46 mole) of dimethylacetamide and 0.001 mole of lithium chloropalladite were stirred at 24° C. in a flask provided with a stirrer, water cooled condenser and a thermometer. Argon was passed through the reaction mixture at 15 litres per hour. 6 gms. of dry methanol (0.19 mole) were introduced into the flask via a serum cap by means of a syringe. The methyl vinyl ether formed was removed in the stream of argon and condensed.

In 256 minutes 0.056 mole of methyl vinyl ether was produced.

EXAMPLE 2

Example 1 was repeated, using 50 gms. (0.58 mole) of vinyl acetate, 40 gms. (0.46 mole) of dimethyl acetamide, 0.001 mole of lithium chloropalladite and 10 gms. (0.32 mole) of methanol. The reaction was carried out at 50° C.

In 54 minutes 0.039 mole of methyl vinyl ether was produced.

EXAMPLE 3

Example 1 was repeated using 20 gms. (0.23 mole) of vinyl acetate, 80 gms. (0.19 mole) of dinonylphthalate and 0.001 mole of palladous chloride and 0.001 mole of lithium chloride were added as catalyst. Vinyl acetate was added continuously to the reactor at a rate of 7 gms. (0.22 mole) per hour. The argon rate was 40 litres per hour and the reaction was carried out at 0° C.

After 6 hours 0.40 mole of methyl vinyl ether was produced, together with 0.04 mole of acetal as by-product.

EXAMPLE 4

Example 1 was repeated using 20 gms. (0.23 mole) of vinyl acetate 80 gms. (0.19 mole) of dinonylphthalate and 0.001 mole of lithium chloropalladite. Vinyl acetate was added continuously to the reactor at a rate of 28 gm. (0.33 mole) per hour and methanol at a rate of 7 gms. (0.22 mole) per hour. The argon rate was 45 litres per hour and the reaction was carried out at 70° C.

After 1 hour 0.07 mole of methyl vinyl ether was produced together with 0.02 mole of acetal as by-product.

EXAMPLE 5

95 gm. (1.1 moles) of vinyl acetate, 0.001 mole lithium chloropalladite and 5 gms. (0.07 mole) of isobutanol were stirred in a flask at 0 °C. There was no additional feed, and argon was not passed through the reaction mixture. An analysis of a sample of the reaction product showed the presence of vinyl isobutyl ether.

EXAMPLE 6

By shaking a solution of 0.002 mole of lithium chloropalladite in methanol with 50 gms. of activated charcoal the catalyst was deposited on the charcoal.

70 mls. of this charcoal were measured out and placed in a tube surrounded by a jacket containing refluxing isopropanol (82.4° C.).

A mixture of 48 gms. (0.56 mole) of vinyl acetate and 2 gms. (0.06 mole) of methanol per hour were run into a round bottomed flask heated to 120° C. and provided with gas inlet and outlet tubes. Argon was passed through the flask at 45 litres per hour. The vinyl acetate and methanol vaporised in the flask and were carried by the stream of argon through the tube containing the catalyst deposited on the charcoal. The gases emerging from the catalyst tube were passed through a water cooled condenser and analysed chromatographically.

After 30 hours 0.21 mole of methyl vinyl ether was produced.

EXAMPLE 7

43 mls. of vinyl acetate, 32 mls. of methanol, 20 mls. of acetic acid and 0.5 ml. of water were stirred at 20° C. in a flask provided with a stirrer, a water cooled condenser and a thermometer. The solution contained lithium chloropalladite ($10\times10^{-4}$ molar) and lithium chloride ($48\times10^{-4}$ molar). Vinyl acetate and methanol were fed into the reaction mixture at a rate of 24 and 15 mls. per hour respectively. Argon was passed through the reaction mixture at a rate of 116 litres per hour.

The methyl vinyl ether and acetal were removed in the stream of argon and condensed.

This basic process was modified by the addition of varying amounts of lithium acetate with the following effect on the rate of formation of methyl vinyl ether and acetal

| Concentration of— | | Rate of formation of— | | |
|---|---|---|---|---|
| Lithium chloropalladite, molar | Lithium acetate, molar | Methyl vinyl ether, moles/litre/hr. | Acetal, mole/litre/hr. | Ratio of ether to acetal |
| $10\times10^{-4}$ | $0.0\times10^{-4}$ | 1.05 | 0.25 | 4.2 |
| $10\times10^{-4}$ | $2.5\times10^{-4}$ | 0.73 | 0.03 | 24.3 |
| $10\times10^{-4}$ | $5.0\times10^{-4}$ | 0.60 | 0.02 | 30.0 |
| $10\times10^{-4}$ | $10.0\times10^{-4}$ | 0.4 | 0.003 | 133 |

EXAMPLE 8

The experimental conditions were the same as in Example 7 but acetal was fed continuously to the reaction mixture with the following results:

| | Mole/litre/hour | | |
|---|---|---|---|
| Feed rate of acetal, mole/hour | Net rate of formation of acetal | Rate of formation of ether | Ratio of ether to acetal |
| 0.00 | 0.25 | 1.05 | 4.2 |
| 0.23 | 0.01 | 0.95 | 95 |

EXAMPLE 9

The experimental conditions were the same as in Example 7 except that the water content of the reaction medium was varied.

| | Rate of formation— | | | Ratio of ether to acetal plus aldehyde |
|---|---|---|---|---|
| Concentration of water, percent weight/volume | Ether, moles/litre/hr. | Acetal, mole/litre/hr. | Acetaldehyde, mole/litre/hr. | |
| 0.0 | 1.5 | 0.20 | 0.00 | 7.5 |
| 5.0 | 0.7 | 0.03 | 0.02 | 14 |

EXAMPLE 10

The experimental conditions were the same as in Example 1 except that lithium chloride was omitted and vinyl acetate and methanol were fed into the reaction mixture at a rate of 38 and 18 mls. per hour respectively. The results show the effect of cupric chloride on the rate of formation of methyl vinyl ether and acetal.

| Concentration of cupric chloride, molar | Rate of formation of— | |
|---|---|---|
| | Ether | Acetal |
| $0.0\times10^{-3}$ | 1.0 | 0.2 |
| $2.4\times10^{-3}$ | 1.6 | 1.1 |

EXAMPLE 11

70 ml.s of vinyl acetate and 30 mls. of methanol were stirred at 20° C. in a flask provided with a stirrer, a water cooled condenser and a thermometer. The solution contained rhodium trichloride trihydrate ($5\times10^{-2}$ molar). Argon was passed through the solution at a rate of 50 litres/hour.

Methyl vinyl ether was formed at a rate of 0.15 mole/litre/hour.

EXAMPLE 12

Example 11 was repeated replacing the rhodium trichloride by ruthenium trichloride trihydrate ($1\times10^{-2}$ molar).

Methyl vinyl ether was formed at a rate of 0.04 mole/litre/hour.

EXAMPLE 13

Example 11 was repeated replacing the rhodium trichloride by chloroplatinic acid ($H_2PtCl_6 4H_2O$) at a concentration of $1\times10^{-4}$ molar.

Methyl vinyl ether was formed at a rate of 0.03 mole/litre/hour.

EXAMPLE 14

Example 11 was repeated using 70 mls. vinyl acetate, 30 mls. isopropanol, $3\times10^{-3}$ molar palladous chloride and lithium chloride ($5\times10^{-3}$ molar).

Vinyl isopropyl ether was formed at a rate of 0.2 mole/litre/hour.

EXAMPLE 15

80 mls. of isopropenyl acetate and 35 mls. of methanol were stirred at 20° C. in a flask provided with a stirrer, a water cooled condenser and a thermometer. The solution contained lithium chloropalladite ($5\times10^{-3}$ molar). Argon was passed through the solution at a rate of 60 litres/hour.

Isopropenyl methyl ether was formed at a rate of 0.1 mole/litre/hour.

EXAMPLE 16

85 mls. of allyl acetate and 5 mls. of methanol were stirred at 40° C. in a flask provided with a stirrer, a water cooled condenser and a thermometer. The solution contained palladous chloride ($1\times10^{-2}$ molar) and lithium chloride ($5\times10^{-2}$ molar). Argon was passed through the solution at a rate of 50 litres/hour. 11 minutes after the reaction had started 5 mls. of acetic acid were added and methanol was added continuously at a rate of 6 mls./hour.

After 150 minutes $1\times10^{-3}$ moles of allyl methyl ether had been produced.

EXAMPLE 17

Example 16 was repeated replacing the methanol by isopropanol.

Allyl isopropyl ether was detected in the product of the reaction.

EXAMPLE 18

70 mls. of allyl acetate and 30 mls. of methanol were stirred at 20° C. in a flask provided with a stirrer, a water cooled condenser and a thermometer. The solution contained chloroplatinic acid ($H_2PtCl_6 4H_2O$) at a concentration of $1\times10^{-3}$ molar. Argon was passed through the solution at a rate of 50 litres/hour.

Allyl methyl ether was formed at a rate of $1\times10^{-3}$ moles/litre/hour.

EXAMPLE 19

Example 18 was repeated replacing the chloroplatinic acid by rhodium trichloride trihydrate ($5\times10^{-2}$ molar).

Allyl methyl ether was formed at a rate of $1\times10^{-3}$ moles/litre/hour.

EXAMPLE 20

A reactor pot was equipped with a thermostatic control to an infra-red lamp which acted as a heater, an oil-sealed hollow cruciform stirrer through which gases could be fed to the reactor and a serum cap through which samples of liquid could be withdrawn.

The gases exit the reactor were led through three acetone/solid carbon dioxide cooled catchpots in series.

A solution was placed in the reactor comprising 40.5 mls. isobutanol, 41 mls. vinyl acetate, 9 mls. of acetic acid and 8 mls. of di-isobutyl acetal. The solution contained lithium chloropalladite $5 \times 10^{-3}$ molar, lithium chloride $2.5 \times 10^{-2}$ molar and lithium acetate $2.5 \times 10^{-3}$ molar.

A mixture of 16:1 volume/volume vinyl acetate and isobutanol was fed into the reactor continuously during the reaction so as to maintain as steady a volume as possible.

Argon was passed through the reaction mixture at a rate of 171 litres/hour and the products removed in the argon stream condensed in the catchpots.

Liquid samples were removed via the serum cap with a syringe and analysed by gas/liquid chromatography for di-isobutyl acetal.

The amount of isobutyl vinyl ether produced was determined by gas liquid chromatography analysis of the contents of the catchpots.

In 300 minutes 0.055 mole of isobutyl vinyl ether and 0.017 mole of di-isobutyl acetal were formed.

We claim:

1. In a process in which unsaturated ethers are produced by contacting a vinyl or allyl ester of an alkanoic acid containing up to 20 carbon atoms with an alkanol containing 1 to 20 carbon atoms at a temperature between about $-50°$ and $200°$ C. under anhydrous conditions or in the presence of up to 10% by weight of water, the improvement which comprises carrying out the reaction in the presence of a stationary concentration of up to 10% acetals formed as by-products and up to about 1 molar concentration of a member selected from the group consisting of halide and alkanoates containing up to six carbon atoms of a noble metal of Group VIII of the Mendeléef Periodic Table, chloroplatinic acid, dichlorobis-(benzonitrile)-palladium (II) and the alkali metal halopalladites and haloplatinites.

2. The process according to claim 1 in which the vinyl or allyl ester is vinyl, isopropenyl or allyl acetate.

3. The process according to claim 1 in which the noble metal is palladium and the alkanol is selected from the group consisting of methanol, ethanol n-propanol, isopropanol, n-butanol and isobutanol.

4. The process according to claim 1 in which an inert solvent selected from the group consisting of pentane, hexane, octane cyclohexane, benzene, toluene, xylene, diethyl ether, dinonyl phthalate, tetrahydrofuran, dioxane, dimethylacetamide, sulpholane, dimethyl sulphoxide and benzonitrile is present.

5. The process according to claim 1 in which a copper acetate or halide redox system is incorporated in the process.

6. The process according to claim 5 in which oxygen is present.

7. The process according to claim 3 in which the concentration of the palladium compound is in the range 0.00001 to 0.01 molar.

8. The process according to claim 3 in which hydrochloric acid is present.

9. The process according to claim 1 conducted in the presence of a member selected from the group consisting of alkali metal hydroxides, alkaline and alkaline earth metal alkanoates containing up to six carbon atoms.

10. The process according to claim 1 in which the process is continuous and a stationary concentration of the alkanoic acid containing up to 20 carbon atoms corresponding to the vinyl or allyl ester of the alkanoic acid used in the process in a concentration of up to 50% by weight of the reaction medium is maintained in the reaction mixture.

11. The process according to claim 1 conducted in the presence of an alkali metal halide.

12. A continuous process for the production of methyl vinyl ether according to claim 1 in which a solution comprising:

$10^{-4}$ to $10^{-3}$ molar lithium chloropalladite, $10^{-3}$ to $10^{-2}$ molar lithium chloride, 20 to 60% by weight of the reaction medium of vinyl acetate, 20 to 40% by weight of the reaction medium of methanol, 20 to 60% by weight of the reaction medium of acetic acid.

at most 5% by weight of the reaction medium of water, is maintained between 20 and 40° C., methyl vinyl ether being removed continuously, a continuous purge of the liquid content of the reaction vessel being taken, acetic acid being removed from said purge in an amount sufficient to maintain its initial concentration in the reaction medium, catalyst in said purge being recycled to the reaction vessel and vinyl acetate and methanol being supplied continuously as they are consumed, a stationary concentration of 1 to 5% by weight of the reaction medium of acetal formed as by-product being maintained in the reaction solution.

13. In a process in which unsaturated ethers are produced by contacting a member selected from the group consisting of vinyl, isopropenyl and allyl acetates with an alkanol containing 1 to 20 carbon atoms at a temperature between about $-50$ and $200°$ C. and having therein up to 10% by weight of water, the improvement which comprises carrying out the reaction in the presence of a stationary concentration of up to 10% acetals formed as by-products and up to about 1 molar concentration of a member selected from the group consisting of chloride and acetate salts of a noble metal of Group VIII of the Mendeléef Periodic Table, lithium chloropalladite, lithium chloroplatinite, chloroplatinic acid and dichlorobis (benzonitrile) palladium II.

14. In a process in which unsaturated ethers are produced by contacting a vinyl or allyl ester of an alkanoic acid containing up to 20 carbon atoms with an alkanol containing 1 to 20 carbon atoms at a temperature between about $-50°$ and $200°$ C. under anhydrous conditions or in the presence of up to 10% by weight of water, the improvement which comprises carrying out the reaction in the presence of a stationary concentration of up to 10% acetals formed as by-products and up to about 1 molar concentration of a member selected from the group consisting of a salt of a noble metal of Group VIII of the Periodic Table wherein the said noble metal of the said salt exhibits its normal valence and the said salt is soluble in the reaction medium, chloroplatinic acid, dichlorobis-(benzonitrile)-palladium (II) and the alkali metal chloro or bromo palladites and chloro or bromo platinites.

15. The process of claim 14 wherein the said salt is a palladium salt.

References Cited

UNITED STATES PATENTS

| | | | |
|---|---|---|---|
| 3,479,392 | 11/1969 | Stern et al. | 260—614X |
| 2,579,411 | 12/1951 | Adelman | 260—614 |
| 2,984,688 | 5/1961 | Sixt | 260—614 |
| 3,188,319 | 6/1965 | Smidt et al. | 260—491X |
| 3,262,969 | 7/1966 | Clark et al. | 260—497A |
| 3,277,159 | 10/1966 | Shaeffer | 260—497A |
| 3,306,930 | 2/1967 | Copelin et al. | 260—497A |

FOREIGN PATENTS

| | | | |
|---|---|---|---|
| 6511468 | 3/1966 | Netherlands | 260—614 |
| 1,017,604 | 1/1966 | Great Britain | 260—614 |

HOWARD T. MARS, Primary Examiner

U.S. Cl. X.R.

260—612, 611, 615, 540, 541, 542, 601